(12) United States Patent
Hunsche

(10) Patent No.: US 6,867,852 B2
(45) Date of Patent: Mar. 15, 2005

(54) METHOD AND APPARATUS FOR CHANNEL DETECTION

(75) Inventor: Stefan Hunsche, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 36 days.

(21) Appl. No.: 10/454,914

(22) Filed: Jun. 5, 2003

(65) Prior Publication Data

US 2004/0246466 A1 Dec. 9, 2004

(51) Int. Cl.[7] ............................................. G01N 21/00
(52) U.S. Cl. ..................................................... 356/73.1
(58) Field of Search ........................ 356/73.1, 450–461, 356/474–484; 385/16–18, 24, 37, 52; 398/45, 56, 79, 48–50; 250/227.11

(56) References Cited

U.S. PATENT DOCUMENTS 6,480,638 B1 * 11/2002 Adkins et al. ................ 385/12
6,778,739 B1 * 8/2004 Jerphagnon et al. .......... 385/52
6,785,446 B1 * 8/2004 Chandrasekhar et al. ..... 385/39

* cited by examiner

Primary Examiner—Tu T. Nguyen

(57) ABSTRACT

A method and apparatus for the detection of optical channels in an optical signal and their reliable discrimination against optical amplifier noise includes splitting an input optical signal into two replicas separated by a delay and adjusting the delay such that a periodicity of the optical filter substantially matches the channel spacing of the input optical signal, such that the optical channels within the input optical signal are directed to a first output and noise within the input optical signal is divided between the first output and a second output. The method and apparatus further include determining a difference in power between the first output and the second output wherein the difference in power is an indication of the presence or absence of optical channels within the input optical signal.

17 Claims, 4 Drawing Sheets

METHOD AND APPARATUS FOR CHANNEL DETECTION

FIELD OF THE INVENTION

This invention relates to the field of wavelength-division multiplexed (WDM) optical networks and, more specifically, to the detection of optical channels in the presence of optical amplifier noise.

BACKGROUND OF THE INVENTION

Unambiguous detection of signal channels in optically amplified systems is necessary for performance monitoring, and to initiate corrective action in case of system failures. Reliable distinction of signal channels from optical amplifier noise is particularly critical for fast suppression of amplifier transients if the signal channels of a system are lost due to a fiber cut or some other failure. In addition, the continuous monitoring of optical amplifier performance to detect and localize degradations or faults before they affect service provides significant savings in the operation costs of optically amplified networks.

Currently, optical performance monitoring is accomplished using various sophisticated detectors, such as optical spectrum analyzers (OSAs) and optical channel monitors (OMONs). OSAs and OMONs may be used to detect changes of optical signal-to-noise ratios, either quantitatively by exact calibration, or by trend analysis over time. However, even in their most rudimentary and scaled-down form, these OSA and OMON devices are bulky and relatively expensive.

SUMMARY OF THE INVENTION

The present invention advantageously provides a novel method and apparatus for the detection of optical signal channels and their reliable discrimination against optical amplifier noise, i.e. amplified spontaneous emission (ASE).

In one embodiment of the present invention, a method for the detection of optical signal channels in optical signals includes splitting, using an optical filter, an input optical signal into two replicas separated by a delay and adjusting the delay such that a periodicity of the optical filter substantially matches the channel spacing of the input optical signal, such that the optical channels within the input optical signal are directed to a first output and noise within the input optical signal is divided between the first output and a second output. The method further includes determining a difference in power between the first output and the second output wherein the difference in power is an indication of the presence or absence of optical channels within the input optical signal. According to one embodiment of the present invention, if the difference in power between the first output and the second output is substantially zero, there are substantially no optical channels present in the input optical signal. Conversely, if the difference in power between the first output and the second output is substantially greater than zero, there is at least one optical channel present in the input optical signal.

In an alternate embodiment of the present invention, an apparatus for the detection of optical signal channels in optical signals includes an optical filter for splitting an input optical signal into two replicas separated by a delay, and a phase controller for adjusting the delay such that a periodicity of the optical filter substantially matches the channel spacing of the input optical signal, such that the optical channels within the input optical signal are directed to a first output and noise within the input optical signal is divided between the first output and a second output. The apparatus further includes a detection means for determining a difference in power between the first output and the second output, where the difference in power is an indication of the presence or absence of optical channels with the input optical signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a relatively low cost method and apparatus for the detection of optical channels. Although embodiments of the present invention will be described with respect to the implementation of a Mach-Zehnder interferometer, it will be appreciated by those skilled in the art and informed by the teachings of the present invention, that various other embodiments of the present invention may be developed implementing various other components for accomplishing the splitting and delaying of input optical signals in accordance with the present invention, such as an optical filter with a periodic transfer function.

Figure 1:
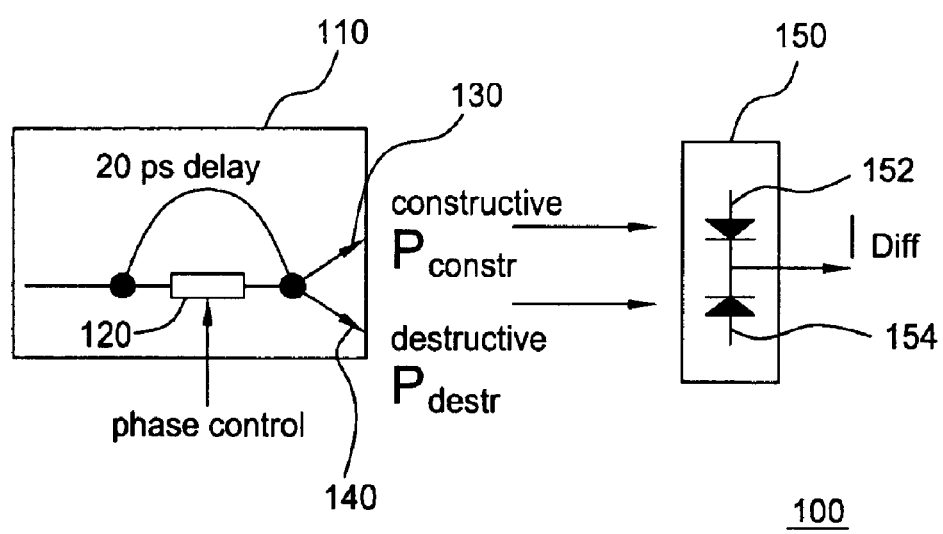
FIG. 1 depicts a high level block diagram of one embodiment of a channel detection device in accordance with the present invention.

FIG. 1 depicts a high level block diagram of one embodiment of a low-cost channel detection device in accordance with the present invention. The channel detection device 100 of FIG. 1 comprises an optical filter (illustratively an asymetric Mach-Zehnder Interferometer) 110 having a phase control device (illustratively a phase shifter) 120 in one arm, a constructive output port 130, a destructive output port 140, and a differential photodetector 150 comprised of a matched (balanced) pair of photodiodes 152, 154. The differential photodetector 150 may further include an optional differential pre-amplifier (not shown). That is, in alternate embodiments of the present invention, a channel detection device, in accordance with the present invention, includes a differential pre-amplifier. Although the channel detection device 100 of FIG. 1 is depicted as comprising an interferometer, other optical components comprising substantially similar functionality, such as an optical filter with a periodic transfer function, may be implemented in a channel detection device in accordance with the present invention.

In the channel detection device 100 of FIG. 1, an optical signal enters the Mach-Zehnder interferometer 110, which splits the optical signal into two, and recombines the two split optical signals with a time delay that determines the periodicity of the filter transmission, which is designed to match the WDM channel spacing. For example, a 20 ps delay in the asymmetric Mach-Zehnder interferometer 110 produces a transfer function with 50 GHz periodicity, suitable to detect channels on a 50 GHz ITU grid.

The optical phase between the recombined optical signals is controlled by the phase shifter 120. The phase delay imparted to the optical signal allows the shifting of the transfer function relative to the International Telecommunications Union (ITU) grid. If the transfer function of the optical signal is aligned with an ITU grid, the optical channels of the optical signal will be directed to the constructive output port 130. In contrast, amplified spontaneous emission (ASE) noise is always split between the constructive output port 130 and the destructive output port 140.

The outputs of the constructive output port 130 and the destructive output port 140 are communicated to the differential photodetector 150. The differential photodetector 150 functionally subtracts the two output signals and determines a resultant difference in optical power of the signal from the constructive output port 130 and the destructive output port 140. The difference between the powers of the constructive output port 130 and the destructive output port 140 may be characterized according to equation one (1), which follows:

$$I_{DIFF} = \int d\lambda \nu \times P_{constr}(\lambda \nu) - \int d\nu \times P_{destr}(\lambda \nu) \quad (1)$$

wherein $P_{constr}(\lambda \nu)$ is the spectral power density as a function of wavelength $\lambda$ from the constructive output port 130, $P_{destr}(\lambda \nu)$ is the spectral power density as a function of wavelength $\lambda$ from the destructive output port 140, and the integrals with respect to wavelength $\lambda$ extend over the full optical bandwidth of the WDM system.

The measurement of the difference in optical power between the constructive output port 130 and the destructive output port 140 results in a large signal if optical channels are present. In contrast, a difference of substantially zero indicates that no optical channels are present in an input optical signal, and as such is an indication that only noise is present in the input optical signal. This measurement provides a reliable indication of the presence of optical channels, largely independent of the total optical power. Although in the channel detection device 100 of FIG. 1 a differential photodetector 150 is implemented to determine a difference between the spectral power of the outputs 130, 140, it will be appreciated by one skilled in the art informed by the teachings of the present invention, that other means for determining the difference in output powers may be implemented in accordance with the present invention. For example, the output signals from each output 130, 140 may be communicated to respective detectors, and the outputs of the respective detectors may then be subsequently compared or subtracted to determine a difference.

For example, in one embodiment of the present invention, the channel detection device 100 of FIG. 1 is used to detect the presence or absence of optical signal channels on the output of an optical amplifier operating in high saturation, such that the total output power of the optical amplifier is independent of the number of input optical channels. As such, in the case of no input optical signal, all of the output power from the amplifier is ASE noise. Because ASE noise is always equally split between the constructive output port 130 and the destructive output port 140 of a channel detection device of the present invention, the resultant difference between the two output ports measured by the differential photodetector 150 in such a case would be substantially zero. As such, the substantially zero difference measured by the differential photodetector 150 would indicate that substantially only ASE noise is present in the measured output of the optical amplifier operating in high saturation.

Figure 2A:
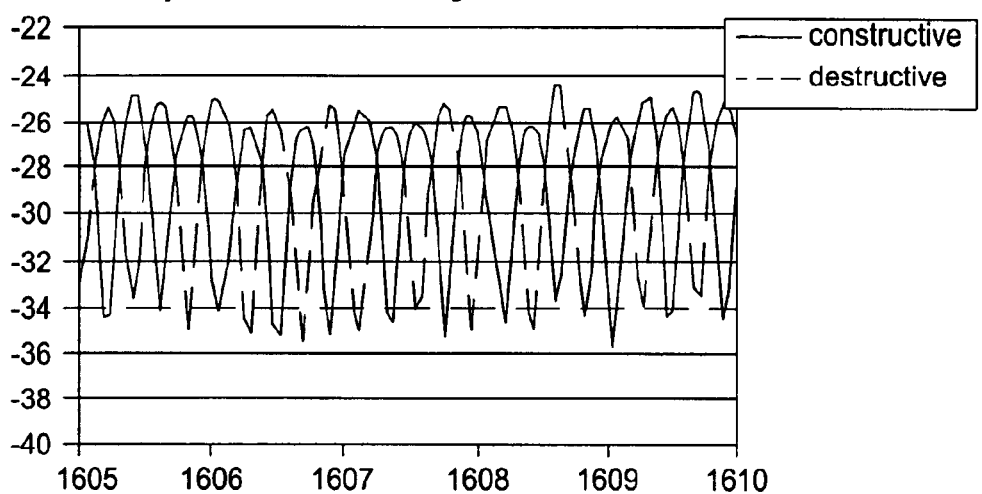
FIG. 2a graphically depicts an exemplary optical spectrum of the complimentary outputs of the channel detection device of FIG. 1 for the case when an input signal does not contain any optical signal channels.

FIG. 2a graphically depicts an exemplary optical spectrum of the complimentary outputs 130, 140 of the channel detection device 100 of FIG. 1 for the case when an input signal does not contain any optical signal channels. The graph of FIG. 2a plots a comparison of the optical spectra of the constructive output port 130 and the destructive output port 140 in the vertical axis versus wavelength in the horizontal axis. As evident in FIG. 2a, when an input signal to the channel detection device 100 does not contain any optical signal channels, the outputs of the constructive output port 130 and the destructive output port 140 are substantially equal in power. As such a resulting difference is substantially zero.

Figure 2B:
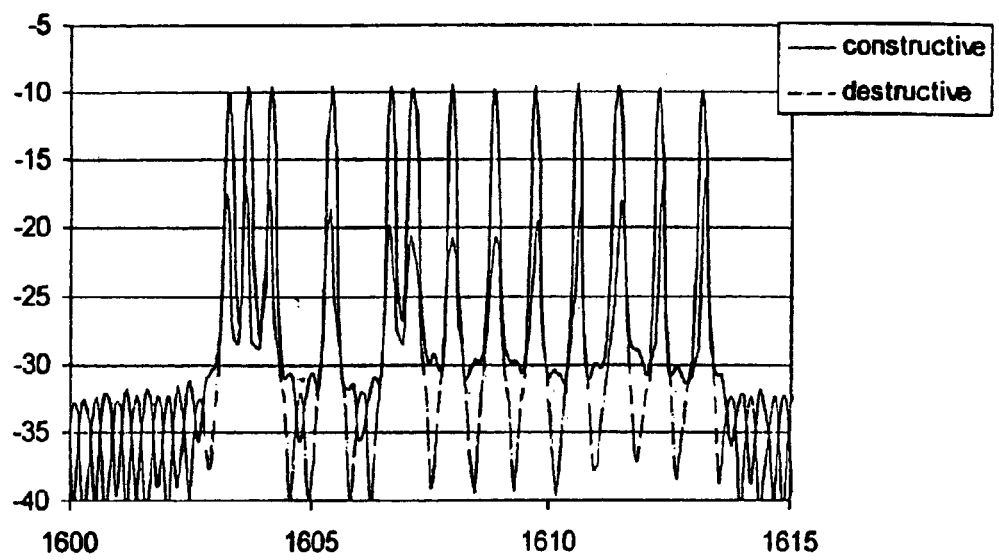
FIG. 2b graphically depicts an exemplary optical spectrum of the complimentary outputs of the channel detection device of FIG. 1 for the case when an input signal does contain a number of optical signal channels.

FIG. 2b graphically depicts an exemplary optical spectrum of the complimentary outputs 130, 140 of the channel detection device 100 of FIG. 1 for the case when an input signal does contain a number of optical signal channels. The graph of FIG. 2b plots a comparison of the optical powers of the constructive output port 130 and the destructive output port 140 in the vertical axis versus wavelength in the horizontal axis. As evident in FIG. 2b, when an input signal to the channel detection device 100 does contain optical signal channels, the outputs of the constructive output port 130 and the destructive output port 140 have a relatively large difference in power. As such a difference measurement results in a relatively large signal.

To optimize the results of a channel detection device in accordance with the present invention, the position of the maxima/minima of the Mach-Zehnder interferometer transfer function needs to be adjusted to obtain the greatest differences between the constructive output port and the destructive output port.

Figure 3:
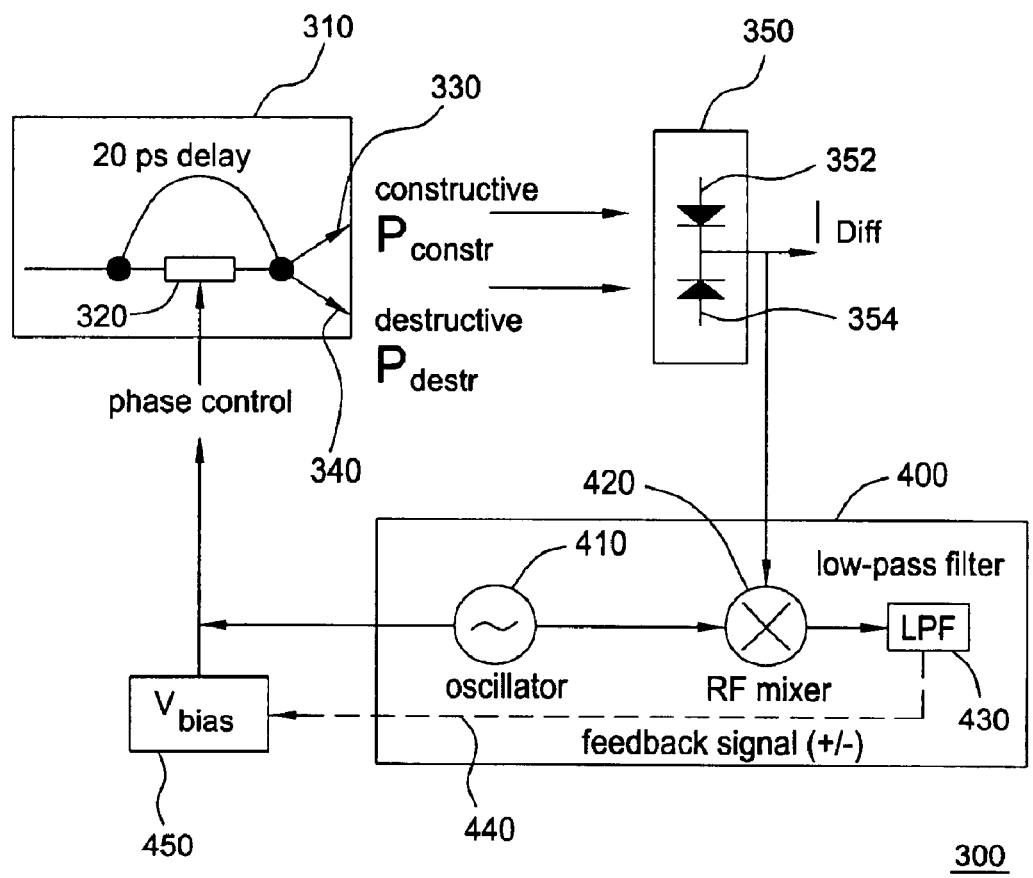
FIG. 3 depicts a high level block diagram of an alternate embodiment of a channel detection device in accordance with the present invention.

FIG. 3 depicts a high level block diagram of an alternate embodiment of a channel detection device in accordance with the present invention. The channel detection device 300 of FIG. 3 comprises an optical filter (illustratively a Mach-Zehnder Interferometer) 310 having a phase control device (illustratively a phase shifter) 320 in one arm, a constructive output port 330, a destructive output port 340, and a differential photodetector 350. The differential photodetector 350 comprises a matched (balanced) pair of photodiodes 352, 354. The differential photodetector 350 may further include an optional differential pre-amplifier (not shown). That is, in alternate embodiments of the present invention, a channel detection device, in accordance with the present invention, comprises a differential pre-amplifier.

The channel detection device 300 of FIG. 3 further comprises a feedback phase control circuit 400. The phase control circuit 400 illustratively comprises an oscillator 410, an RF mixer 420, a low-pass filter (LPF) 430, a feedback signal path 440, and a bias controller 450 for the phase shifter 320. Feedback circuits such as the feedback phase control circuit 400 of FIG. 3 are well-known to those skilled in the art and as such will not be described in detail herein.

The functionality of the channel detection device 300 of FIG. 3 is substantially similar to that of the channel detection device 100 of FIG. 1. That is, an optical signal enters the Mach-Zehnder interferometer 310, which generates two replicas of the optical signal separated by a phase delay. The phase delay between the replicas is controlled by the phase shifter 320. The phase delay imparted to the optical signal allows the shifting of the transfer function relative to an International Telecommunications Union (ITU) grid. Again, if the transfer function of the optical signal is aligned with an ITU grid, the optical channels of the optical signal will be directed to the constructive output port 330. In contrast, amplified spontaneous emission (ASE) noise is always equally split between the constructive output port 130 and the destructive output port 340.

The outputs of the constructive output port 330 and the destructive output port 340 are communicated to the differential photodetector 350. The differential photodetector 350 functionally subtracts the two output signals and determines a resultant difference in optical power of the signal from the constructive output port 330 and the destructive output port 340.

As describe above, a measurement of the difference in optical power between the constructive output port 330 and the destructive output port 340 results in a large signal if optical channels are present. In contrast, a difference of substantially zero indicates that no optical channels are present in an input optical signal, and as such is an indication that only noise is present in the input optical signal. Although in the channel detection device 300 of FIG. 3 a differential photodetector 350 is implemented to determine a difference between the spectral power of the outputs 330, 340, it will be appreciated by one skilled in the art informed by the teachings of the present invention, that other means for determining the difference in output powers may be implemented in accordance with the present invention. For example, the output signals from each output 330, 340 may be communicated to respective detectors, and the outputs of the respective detectors may then be subsequently compared or subtracted to determine a difference.

Furthermore, in the channel detection device 300 of FIG. 3, a portion of the optical signal from the differential photodetector 350 is directed to the phase control circuit 400. The optical signal from the comparison circuit 350 is received by the RF mixer RF mixer 420. The signal from the RF mixer is then communicated to the LPF 430. The output of the LPF 430 is communicated as a feedback signal to the bias controller 450 via the feedback signal path 440. The oscillator 410 provides a small dithering to the bias signal from the bias controller 450 to the phase shifter 320.

The dithering from the oscillator 410 and the relatively slow feedback signal from the LPF 430 provided to the bias control signal of the bias controller 450 are implemented to optimize the bias setting of the phase delay in the Mach-Zehnder Interferometer 310. The optimized bias setting better aligns the optical transfer function of the Mach-Zehnder Interferometer 310 with a channel ITU grid while the differential signal is monitored to indicate loss of channels to maximize the differential signal. As such the fast detection of channel loss in an input optical signal may be achieved.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   splitting, using an optical filter, an input optical signal into two replicas separated by a delay;
   adjusting said delay such that a periodicity of said optical filter substantially matches the channel spacing of said input optical signal, such that optical channels within said input optical signal are directed to a first output and noise within said input optical signal is divided between said first output and a second output; and
   determining a difference in power between said first output and said second output, wherein said difference in power is an indication of the presence or absence of optical channels within said input optical signal.

2. The method of claim 1, wherein the transfer function of said optical filter is aligned to a channel grid.

3. The method of claim 2, wherein said channel grid comprises an ITU channel grid.

4. The method of claim 1, wherein if the difference in power between said first output and said second output is substantially zero, there are no optical channels present within said input optical signal.

5. The method of claim 1, wherein if said difference in power between said first output and said second output is substantially greater than zero, there is at least one optical channel present within said input optical signal.

6. The method of claim 1, wherein said noise is amplifier noise.

7. The method of claim 1, further comprising providing a feedback signal to adjust the periodicity of said optical filter.

8. The method of claim 1, further comprising dithering a delay control signal to adjust said delay.

9. A channel detection device, comprising:
   an optical filter for splitting an input optical signal into two replicas separated by a delay;
   a phase controller for adjusting said delay such that a periodicity of said optical filter substantially matches the channel spacing of said input optical signal, such that said optical channels are directed to a first output and noise within said input optical signal is divided between said first output and a second output; and
   a detection means for determining a difference in power between said first output and said second output wherein said difference in power is an indication of the presence or absence of optical channels with said input optical signal.

10. The channel detection device of claim 9, wherein said detection means comprises a differential photodetector.

11. The channel detection device of claim 10, wherein said differential photodetector comprises a matched pair of photodiodes.

12. The channel detection device of claim 11, wherein said differential photodetector further comprises a differential pre-amplifier.

13. The channel detection device of claim 9, wherein said phase controller comprises a phase shifter.

14. The channel detection device of claim 9, further comprising a phase control circuit for adjusting the phase of said phase controller.

15. The channel detection device of claim 14, wherein said phase control circuit comprises:
   a bias controller for providing a signal to adjust the phase of said phase controller;
   an oscillator for dithering said control signal of said bias controller; and
   a feedback signal path for communicating a feedback signal to said bias controller.

16. The channel detection device of claim 9, wherein said optical filter comprises an interferometer.

17. The channel detection device of claim 16, wherein said interferometer comprises an asymmetric Mach-Zehnder interferometer.

* * * * *